US008176753B2

(12) United States Patent
Kahlout et al.

(10) Patent No.: US 8,176,753 B2
(45) Date of Patent: May 15, 2012

(54) METHODS AND APPARATUS FOR REDUCING HEAT LOSS FROM AN EDGE DIRECTOR

(75) Inventors: Ahdi El Kahlout, Lexington, KY (US); Soongyup Jason Lee, Elgin, IL (US); Shinya Sakamoto, Kakegawa (JP)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/713,369

(22) Filed: Feb. 26, 2010

(65) Prior Publication Data

US 2011/0209502 A1 Sep. 1, 2011

(51) Int. Cl.
*C03B 13/00* (2006.01)
*C03B 15/02* (2006.01)

(52) U.S. Cl. .................. 65/90; 65/193; 65/205

(58) Field of Classification Search ............... 65/90, 91, 65/193, 195, 199, 203, 205
See application file for complete search history.

(56) References Cited

U.S. PATENT DOCUMENTS

| 1,631,805 | A | * | 6/1927 | Ferngren | 65/53 |
|---|---|---|---|---|---|
| 3,451,798 | A | | 6/1969 | Simon | 65/199 |
| 3,537,834 | A | | 11/1970 | Simon | 65/199 |
| 3,656,929 | A | * | 4/1972 | Gildea | 65/129 |
| 7,409,839 | B2 | * | 8/2008 | Boratav et al. | 65/199 |
| 2003/0121287 | A1 | * | 7/2003 | Chalk et al. | 65/90 |
| 2006/0016219 | A1 | * | 1/2006 | Pitbladdo | 65/29.21 |
| 2008/0264104 | A1 | | 10/2008 | Boratav et al. | 65/90 |
| 2009/0100873 | A1 | | 4/2009 | Allan et al. | 65/85 |

FOREIGN PATENT DOCUMENTS

| EP | 2253598 A1 | * | 11/2010 |
| JP | 05163032 A | * | 6/1993 |
| JP | 10-053425 | | 2/1998 |

* cited by examiner

*Primary Examiner* — Matthew Daniels
*Assistant Examiner* — Lisa Herring
(74) *Attorney, Agent, or Firm* — Kevin M. Able

(57) ABSTRACT

An apparatus for making a glass sheet includes a forming wedge with a pair of inclined forming surface portions converging along a downstream direction to form a root. The apparatus further includes an edge director intersecting with at least one of the pair of downwardly inclined forming surface portions, and a thermal shield configured to reduce heat loss from the edge director. Methods are also provided for reducing heat loss from the edge director with a thermal shield.

20 Claims, 4 Drawing Sheets

METHODS AND APPARATUS FOR
REDUCING HEAT LOSS FROM AN EDGE
DIRECTOR

FIELD

The present invention relates generally to apparatus and methods for making glass sheets, and more particularly, to apparatus and methods for making glass sheets with edge directors.

BACKGROUND

Glass manufacturing systems are commonly used to form various glass products such as LCD glass sheets. It is known to manufacture glass sheets by downwardly flowing molten glass over a forming wedge. Edge directors are frequently provided at opposed ends of the forming wedge to help achieve a desired glass sheet width and edge bead characteristics.

SUMMARY

The following presents a simplified summary of the disclosure in order to provide a basic understanding of some example aspects described in the detailed description.

In one example aspect, a fusion draw method of making a glass sheet comprising the step of flowing a molten glass over a pair of downwardly inclined forming surface portions of forming wedge, the downwardly inclined forming surface portions converging along a downstream direction to form a root. The method further includes the steps of flowing the molten glass over an edge director intersecting with at least one of the pair of downwardly inclined forming surface portions and drawing the molten glass from the root of the forming wedge to form the glass sheet. The method further includes the step of reducing heat loss from the edge director with a thermal shield.

In another example aspect, a fusion draw method of making a glass sheet comprises the step of flowing molten glass over a pair of downwardly inclined forming surface portions of a forming wedge, the downwardly inclined forming surface portions converging along a downstream direction to form a root. The method further includes the step of flowing the molten glass over an edge director intersecting with at least one of the pair of downwardly inclined forming surface portions and drawing the molten glass from the root of the forming wedge to form the glass sheet. The method further includes the steps of engaging an edge portion of the glass sheet with a pair of edge rollers positioned downstream from the root and using a thermal shield to reduce heat loss from the edge director to the pair of edge rollers.

In yet another example aspect, an apparatus for making a glass sheet is provided. The apparatus includes a forming wedge with a pair of inclined forming surface portions converging along a downstream direction to form a root. The apparatus further includes an edge director intersecting with at least one of the pair of downwardly inclined forming surface portions, and a thermal shield configured to reduce heat loss from the edge director.

BRIEF DESCRIPTION OF THE DRAWINGS

These and other aspects are better understood when the following detailed description is read with reference to the accompanying drawings, in which.

DETAILED DESCRIPTION

Figure 1:
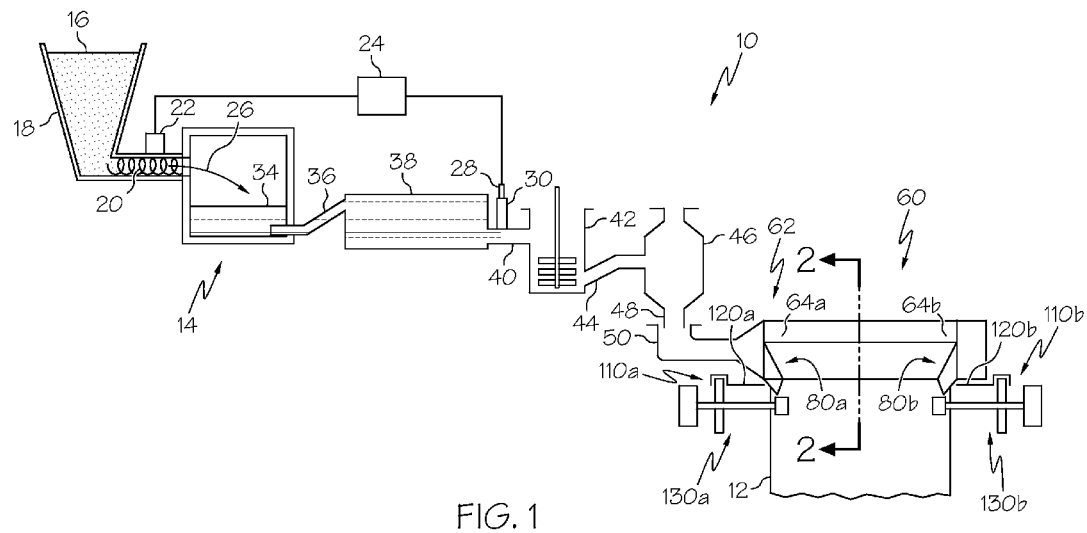
FIG. 1 is a schematic view of an apparatus for making glass.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

FIG. 1 illustrates a schematic view of an apparatus 10 for making glass, such a glass sheet 12. The apparatus 10 can include a melting vessel 14 configured to receive batch material 16 from a storage bin 18. The batch material 16 can be introduced to the melting vessel 14 by a batch delivery device 20 powered by a motor 22. An optional controller 24 may be provided to activate the motor 22 and a molten glass level probe 28 can be used to measure the glass melt level within a standpipe 30 and communicate the measured information to the controller 24.

The apparatus 10 can also include a fining vessel 38, such as a fining tube, located downstream from the melting vessel 14 and coupled to the melting vessel 14 by way of a first connecting tube 36. A mixing vessel 42, such as a stir chamber, can also be located downstream from the fining vessel 38 and a delivery vessel 46, such as a bowl, may be located downstream from the mixing vessel 42. As shown, a second connecting tube 40 can couple the fining vessel 38 to the mixing vessel 42 and a third connecting tube 44 can couple the mixing vessel 42 to the delivery vessel 46. As further illustrated, a downcomer 48 can be positioned to deliver glass melt from the delivery vessel 46 to an inlet 50 of a forming vessel 60. As shown, the melting vessel 14, fining vessel 38, the mixing vessel 42, delivery vessel 46, and forming vessel 60 are examples of glass melt stations that may be located in series along the apparatus 10.

The melting vessel 14 is typically made from a refractory material, such as refractory (e.g. ceramic) brick. The apparatus 10 may further include components that are typically made from platinum or platinum-containing metals such as platinum-rhodium, platinum-iridium and combinations thereof, but which may also comprise such refractory metals such as molybdenum, palladium, rhenium, tantalum, titanium, tungsten, ruthenium, osmium, zirconium, and alloys thereof and/or zirconium dioxide. The platinum-containing components can include one or more of the first connecting tube 36, the fining vessel 38, the second connecting tube 40, the standpipe 30, the mixing vessel 42, the third connecting tube 44, the delivery vessel 46, the downcomer 48 and the inlet 50. The forming vessel 60 can also made from a refractory material and is designed to form the glass sheet 12.

Figure 2:
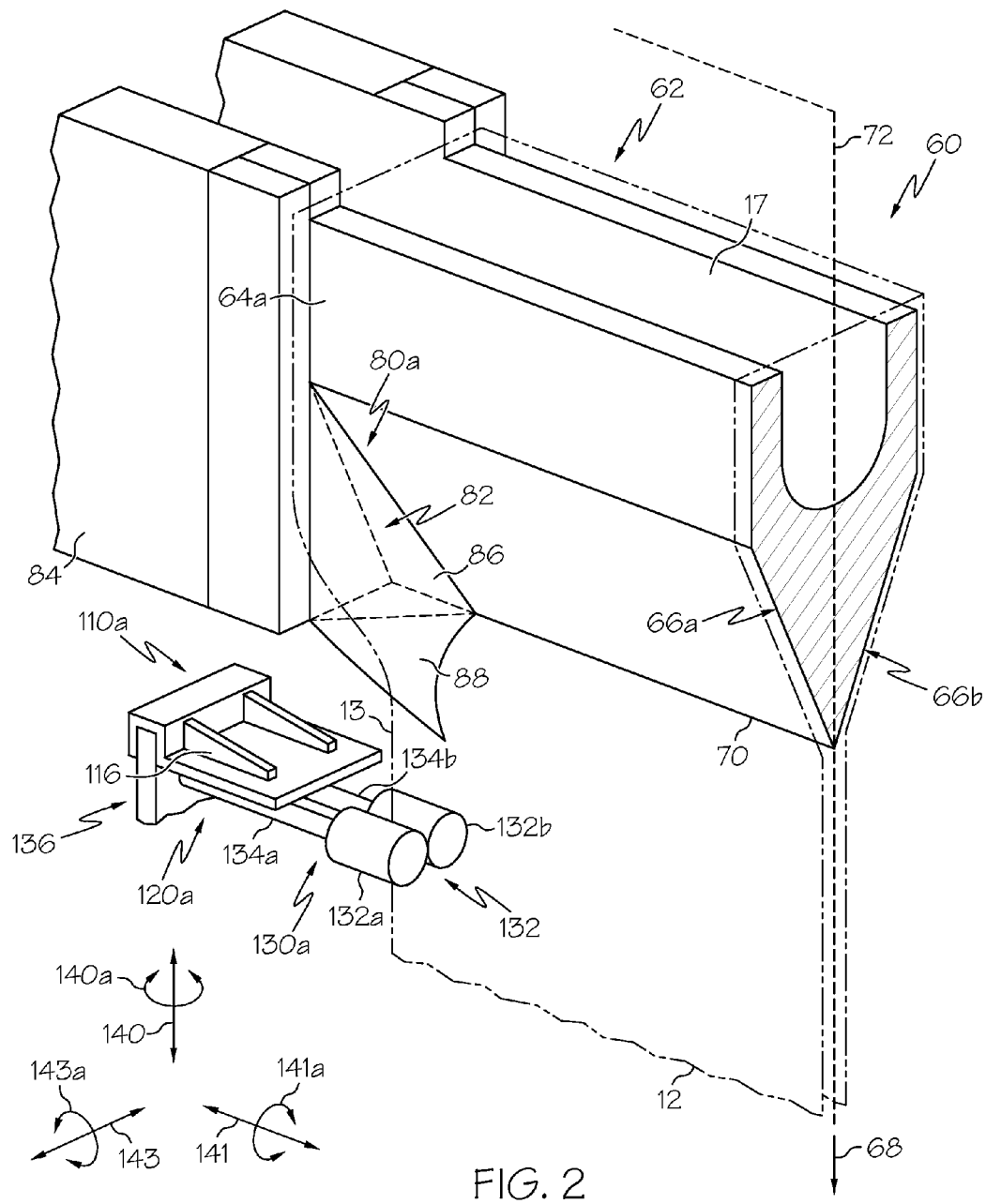
FIG. 2 is a cross sectional perspective view of the apparatus along line 2-2 of FIG. 1 illustrating a first example of a heat shield apparatus.

FIG. 2 is a cross sectional perspective view of the apparatus 10 along line 2-2 of FIG. 1. As shown, the forming vessel 60 includes a forming wedge 62 comprising a pair of downwardly inclined forming surface portions 66a, 66b that can extend between opposed ends 64a, 64b of the forming wedge 62. The downwardly inclined forming surface portions 66a, 66b converge along a downstream direction 68 to form a root 70. A draw plane 72 extends through the root 70 wherein the glass sheet 12 may be drawn in the downstream direction 68 along the draw plane 72. As shown, the draw plane 72 can bisect the root 70 although the draw plane 72 may extend at other orientations with respect to the root 70. Aspects of the disclosure may be used with various forming vessels. For example, aspects of the disclosure may be used with apparatus for reducing radiative heat loss from a forming body disclosed in U.S. Provisional Pat. Application No. 61/180,216, filed May 21, 2009 which is herein incorporated by reference in its entirety.

The forming vessel 60 may comprise an edge director intersecting with at least one of the pair of downwardly inclined forming surface portions 66a, 66b. In further examples, the edge director can intersect with both downwardly inclined forming surface portions 66a, 66b. In addition or alternatively, an edge director can be positioned at each of the opposed ends of the forming wedge 62. For instance, as shown in FIG. 1, an edge director 80a, 80b can be positioned at each of the opposed ends 64a, 64b of the forming wedge 62 with each edge director 80a, 80b configured to intersect with both of the downwardly inclined forming surface portions 66a, 66b. As further illustrated, each edge director 80a, 80b is substantially identical to one another although the edge directors may have different characteristics in further examples. Various forming wedge and edge director configurations may be used in accordance with aspects of the present disclosure. For example, aspects of the present disclosure may be used with forming wedges and edge director configurations disclosed in U.S. Pat. Nos. 3,451,798, 3,537,834, 7,409,839 and/or U.S. Provisional Pat. Application No. 61/155,669, filed Feb. 26, 2009 that are each herein incorporated by reference in its entirety.

Figure 3:
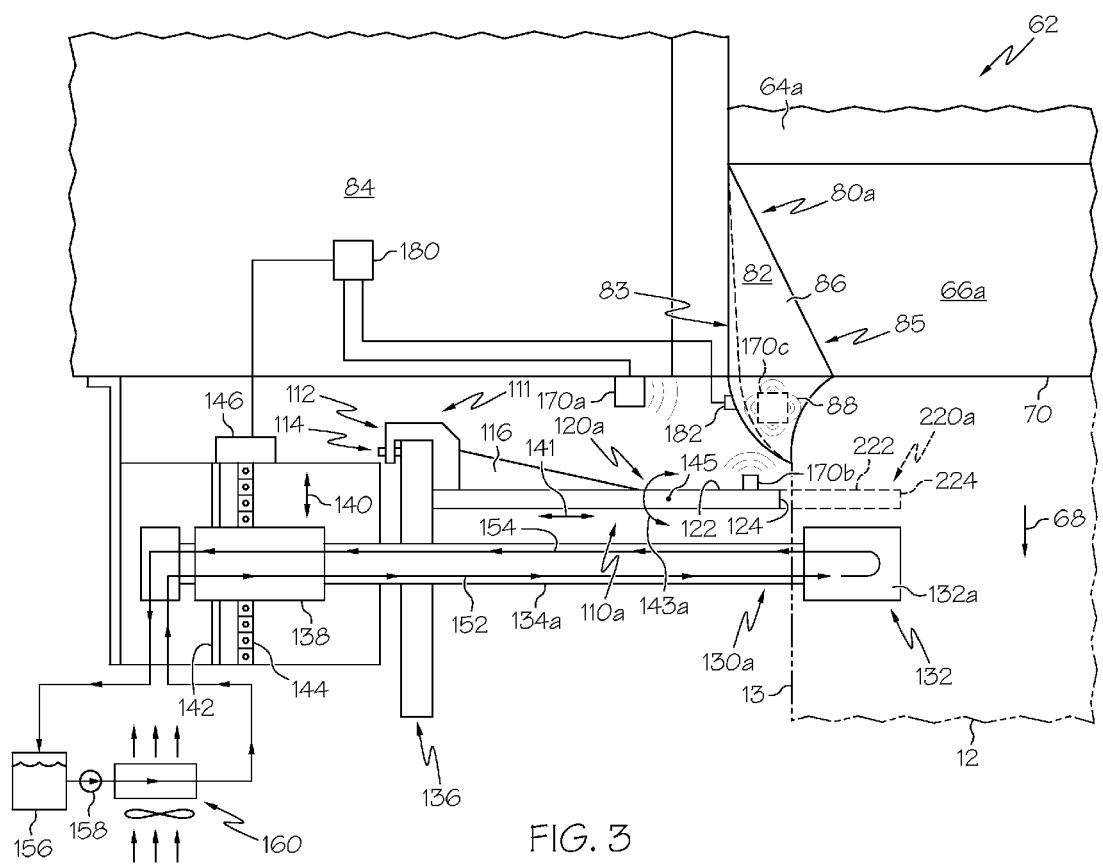
FIG. 3 is a side view of the apparatus for making glass of FIG. 2.

FIGS. 2 and 3 illustrate just one example edge director that may be used with aspects of the disclosure. The first edge director 80a will be discussed with the understanding that the second edge director 80b, in some examples, may be similar or identical to the first edge director 80a. Providing identical edge directors can be beneficial to provide a uniform glass sheet although the edge directors may have different features to provide varied glass sheet characteristics and/or accommodate various forming vessel configurations.

FIGS. 2 and 3 illustrate a first side of the first edge director 80a positioned with respect to the first downwardly inclined forming surface portion 66a of the forming wedge 62. Although not shown, the first edge director 80a further includes a second side positioned with respect to the second inclined forming surface portion 66b of the forming wedge 62. The second side of the first edge director 80a is a mirror image of the first side about the draw plane 72 bisecting the root 70. As shown, the first side includes a first surface 82 that intersects the first downwardly inclined forming surface portion 66a of the forming wedge 62. Although not shown, the second side of the first edge director 80a also includes a substantially identical surface that intersects the second inclined forming surface portion 66b of the forming wedge 62.

Each opposed end 64a, 64b of the forming wedge 62 can be provided with a retaining block 84 designed to help laterally position the corresponding first and second edge directors 80a, 80b. Optionally, as shown, the first edge director 80a can include an upper portion 86 and a lower portion 88. The lower portion 88 can, in some examples, join the first edge director 80a on the first opposed end 64a with the second edge director 80b on the second opposed end 64b. Joining the edge directors 80a, 80b together can be beneficial to simplify assembly of the edge directors 80a, 80b to the forming wedge 62. In further examples, the upper portions 86 of the edge directors 80a, 80b may be provided separately. For example, as shown, the first edge director 80a can be separate from the second edge director 80b and assembled independently to each of the pair of downwardly inclined forming surface portions 66a, 66b of the forming wedge 62. With certain configurations, providing upper portions 86 that are not joined may simplify manufacturing of the edge directors 80a, 80b. Each edge director 80a, 80b can have a variety of orientations and geometries by providing different surfaces relative to the forming wedge 62.

The apparatus 10 for making glass can also include at least one edge roller device including a pair of edge rollers configured to engage a corresponding edge of the glass ribbon as the ribbon is drawn off the root 70 of the forming wedge 62. The pair of edge rollers facilitates proper finishing of the edges of the glass sheet. Edge roller finishing provides desired edge characteristics and proper fusion of the edge portions of the molten glass being pulled off opposed surfaces of the edge director associated with the pair of downwardly inclined forming surface portions 66a, 66b. In one example, the edge rollers can be located at various positions within the viscous region of the glass being drawn from the 70. For instance, the edge rollers can be located anywhere from immediately below the root 70 to a position about 15 inches below the root 70 although other positions may be contemplated in further examples. In still another example, the edge rollers can be located at a position within a range of from about 8 inches to about 10 inches below the root 70.

As shown in FIG. 1, a first edge roller assembly 130a is associated with the first edge director 80a and a second edge roller assembly 130b is associated with the second edge director 80b. As further illustrated, each edge roller assembly 130a, 130b is substantially identical to one another although the pairs of edge rollers may have different characteristics in further examples.

FIGS. 2 and 3 illustrate an example edge roller assembly that may be used with aspects of the disclosure. The first edge roller assembly 130a will be discussed with the understanding that the second edge roller assembly 130b, in some examples, may be similar or identical to the first edge roller assembly 130a. As shown in FIG. 2, the first edge roller assembly 130a includes a first pair of edge rollers 132 including a first edge roller 132a and a second edge roller 132b. The edge rollers 132a, 132b are configured to simultaneously engage the first side and the second side of the glass sheet 12. The first edge roller assembly 130a further includes a first shaft 134a attached to the first edge roller 132a and a second shaft 134b attached to the second edge roller 132b. The first and second shafts 134a, 134b extend through a seal plate 136 and are configured to be rotatably driven by a motor 138. The seal plate 136 is configured to provide closure to an opening leading to the area housing the motor 138. The seal plate may comprise a refractory material, steel, or other thermal insulation to protect sensitive components of the motor and/or other mechanisms located within the housing area.

As further illustrated in FIG. 3, the motor 138 can optionally be supported for vertical adjustment along vertical direction arrow 140. For instance, as shown, the motor can be slidably supported along track 142 to provide a vertical travel path. A threaded shaft 144 can be threaded through a coupling supporting the motor 138 (not shown). A motor 146 may be provided to provide rotation of the threaded shaft 144 for vertical movement of the motor 138, together with the first and second rollers 132a, 132b, the first and second shafts 134a, 134b and the seal plate 136. The seal plate 136 can be adjusted along vertical direction arrow 140 while maintaining a sealing relationship with respect to the opening into the housing area.

As further shown in FIG. 3, the first and second rollers 132a, 132b may be actively cooled (e.g., with gas or liquid) to help reduce the likelihood of molten glass being deposited on the edge rollers 132a, 132b and therefore allow the edge rollers to condition the molten glass and produce the desired glass edge quality. For instance, as shown in FIG. 3, an inlet line 152 is configured to extend through each shaft 134a, 134b to provide a cooling liquid to the first and second rollers 132a, 132b. An outlet line 154 also extends through each shaft 134a, 134b to return heated liquid to a fluid source 156. A hydraulic pump 158 can draw fluid from the fluid source and passed through a heat exchanger 160 to remove heat transferred from the first and second rollers 132a, 132b before cycling back through the inlet line 152 to continue cooling the first and second rollers 132a, 132b.

The forming vessel 60 may also be provided with a thermal shield apparatus including a thermal shield associated with at least one of the edge directors 80a, 80b. The thermal shields are configured to reduce heat loss from the corresponding edge directors 80a, 80b to non-target areas, and in particular, heat loss to the cooled edge rollers. Such non-target areas can include nearby areas of the glass making apparatus and/or other locations capable of receiving heat transfer from the edge directors. As shown in FIG. 1, a first thermal shield apparatus 110a includes a first thermal shield 120a associated with the first edge director 80a. Likewise, a second thermal shield apparatus 110b includes a second thermal shield 120b associated with the second edge director. As further illustrated, each thermal shield apparatus 110a, 110b is substantially identical to one another although the thermal shield apparatus may have different characteristics in further examples. Providing identical thermal shield apparatus can be beneficial to provide similar thermal shielding of the edge directors although the thermal shield apparatus may have different features to accommodate various forming vessel configurations.

FIGS. 2 and 3 illustrate just one example thermal shield apparatus that may be used with aspects of the disclosure. The first thermal shield apparatus 110a will be discussed with the understanding that the second thermal shield apparatus 110b, in some examples, may be similar or identical to the first thermal shield apparatus 110a.

The first thermal shield can be positioned below a portion or the entire first edge director, and extends generally in a length-wise direction relative to the long dimension of the forming wedge and in close proximity to the edge roller shafts. As shown in FIGS. 2 and 3, the first thermal shield 120a may be positioned to be located below only a portion of the first edge director 80a. Indeed, as shown in FIG. 3, the first thermal shield 120a includes a thermal plate 122 with an end 124 terminating outside of the corresponding edge 13 of the glass sheet 12. As such, the thermal plate 122 only extends under an outside portion 83 of the first edge director 80a without extending under an inner portion 85 of the first edge director. Providing the first thermal shield 120a at a location underneath only a portion of the first edge director 80a can provide sufficient reduction of heat loss to non-target areas while avoiding possible interference with the molten glass being drawn from the root 70 of the forming wedge 62.

The first thermal shield can also extend entirely below the first edge director. For example, FIG. 2A and dashed portions of FIG. 3 illustrate another example of a first thermal shield apparatus 210a associated with the first edge director 80a. As shown, the first thermal shield apparatus 210a includes a thermal plate 222 with an end 224 terminating inside of the corresponding edge 13 of the glass sheet 12. In one example, the thermal plate 222 only extends relative to one side of the glass sheet 12 thereby allowing the thermal shield to extend below the entire first edge director. Alternatively, as shown, the thermal plate 222 may include a slot 226 to provide passage of the edge 13 and corresponding edge portion of the glass sheet 12. As such, the end 224 of the thermal plate 222 extends relative to both sides of the glass sheet 12 while allowing the thermal shield to extend below the entire first edge director 80a. Positioning the thermal shield to extend below the entire first edge director 80a can minimize heat loss from the first edge director 80a to non-target areas.

Figure 2A:
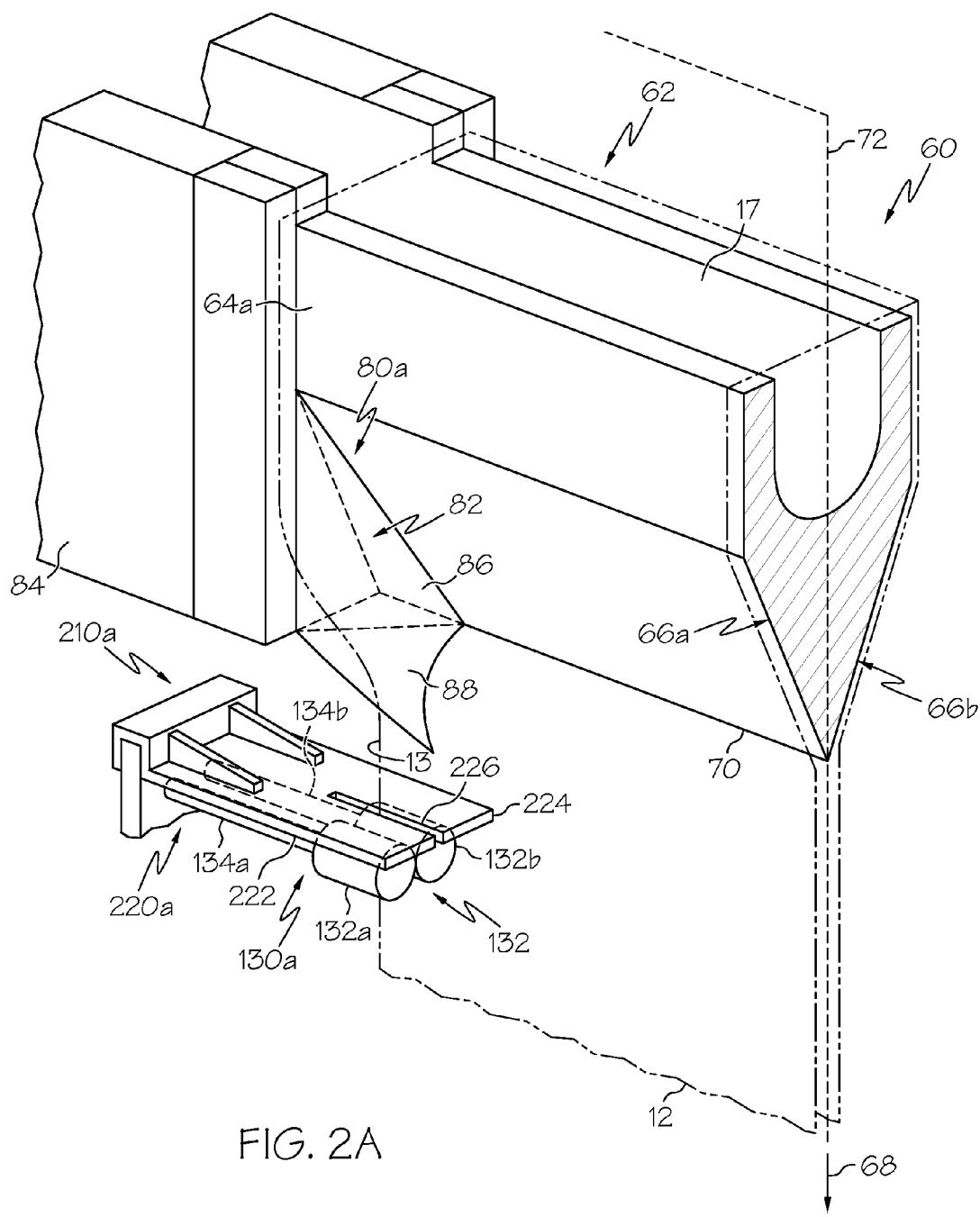
FIG. 2A is a perspective view of the apparatus with another example of a heat shield apparatus.

As set forth above, the first thermal shield can be positioned below a portion or the entire first edge director. In addition or alternatively, the first thermal shield can be positioned partially or entirely downstream from the first edge director. For instance, as shown in FIGS. 2 and 3, the first thermal shield 120a is positioned entirely downstream along direction 68 from the first edge director 80a. Likewise, as shown in FIG. 2A and dashed portions of FIG. 3, the first thermal shield 220a is positioned entirely downstream along direction 68 from the first edge director 80a. Positioning the first thermal shield 120a, 220a entirely downstream of the first edge director 80a can help minimize heat loss from the first edge director to non-target areas located downstream from the first edge director 80a.

Although not shown, the first thermal shield can be positioned only partially downstream from the first edge director. For instance, the first thermal shield can be positioned downstream from an upper portion the first edge director while a lower portion of the first edge director is positioned downstream from the first thermal shield. This positioning may be accomplished, for example, by designing the slot 226 of the thermal plate 222 of FIG. 2A to receive the at least part of the lower portion 88 of the first edge director 80a. In further examples, the first thermal shield may be positioned only adjacent a first side of the first edge director with an upper portion of the edge director extending above the first thermal shield and a lower portion of the edge director extending below the first thermal shield. Positioning the first thermal shield only partially downstream from the first edge director 80a can provide sufficient reduction of heat loss to non-target areas while providing a compact design or otherwise accommodating different forming vessel designs.

In further examples, the first thermal shield can be located upstream from the first pair of edge rollers. For example, as shown in FIGS. 2, 2A and 3, the first thermal shield 120a, 220a is positioned upstream from the first pair of edge rollers 132. Positioning the first thermal shield 120a, 220a upstream from the first pair of edge rollers 132 reduces heat loss from the first edge director 80a to the first pair of edge rollers 132. As such, the first pair of edge rollers 132 and/or shafts 134a, 134b, such as the illustrated actively cooled first pair of edge rollers and shafts, may be insulated from acting as a heat sink for the first edge director 80a.

The thermal shield may also be positioned partially or entirely between the first pair of edge rollers and the first edge director. For example, as shown in FIGS. 2 and 3, the first thermal shield 120a may be positioned only partially between first pair of edge rollers 132 and the first edge director 80a. Indeed, as shown in FIG. 3, the thermal plate 122 only extends between the outside portion 83 of the first edge director 80a and the first shaft 134a and the second shaft 134b of the first pair of edge rollers 132. The end 124 of the thermal plate 122 terminates outside of the corresponding edge 13 of the glass sheet 12. As such, the thermal plate 122 does not extend between the inner portion 85 of the first edge director 80*a* and the edge rollers 132*a*, 132*b* of the first pair of edge rollers 132. Providing the first thermal shield 120*a* positioned only partially between the first pair of edge rollers 132 and the first edge director 80*a* can provide sufficient reduction of heat loss while avoiding possible interference with the molten glass being drawn from the root 70 of the forming wedge 62.

As further shown in FIG. 2A and dashed portions of FIG. 3, the first thermal shield 220*a* can also extend entirely between the first pair of edge rollers 132 and the first edge director 80*a*. As shown in FIG. 2A, the thermal plate 222 may include a slot 226 to provide passage of the edge 13 and corresponding edge portion of the glass sheet 12. As such, the end 224 of the thermal plate 222 extends relative to both sides of the glass sheet 12 while allowing the thermal shield to be positioned entirely between the first pair of edge rollers 132 and both sides the first edge director 80*a*. Positioning the first thermal shield 220*a* entirely between the first pair of edge rollers 132 and the first edge director 80*a* can help minimize heat loss from the first edge director to the first pair of edge rollers 132.

The apparatus 10 can also include one or more optional heaters associated with one or both of the edge directors 80*a*, 80*b*. If provided, the one or more heaters can comprise a wide variety of configurations that are capable of heating an interface of the molten glass in contact with the edge directors 80*a*, 80*b*. For example, refractory or metallic resistance heaters, induction heaters or other heating devices may be used. In one example, general resistance winding heaters (e.g., platinum winding, molybdenum disilicide winding, etc.) may be used although other configurations are possible in further examples. Moreover, the heaters can be positioned at various locations with respect to the corresponding edge director. As shown in FIG. 3, a first example heating device 170*a* may be positioned laterally with respect to the first edge director 80*a* and configured to transfer heat laterally toward the first edge director 80*a*. In addition or alternatively, a second example heating device 170*b* may be positioned on the first thermal shield 120*a* and configured to direct heat upwardly toward the first edge director 80*a*. Still further, in addition or alternatively, a third example heating device 170*c* may be located inside the first edge director 80*a* and configured to internally heat the first edge director 80*a*. More or less heaters may be used in different locations in further examples. All of the illustrated heating devices 170*a*, 170*b*, 170*c* are positioned upstream from the first thermal shield although the heaters may be located in other positions in further examples. Furthermore, the one or more heaters may be located partially or entirely between the first edge director 80*a* and the first thermal shield 120*a*. For example, as shown, the second heating device 170*b* is positioned entirely between the first edge director 80*a* and the first thermal shield 120*a*. Optionally, the position of the heating devices may be adjustable (e.g., by translation or rotation) to provide desired heating characteristics.

A variety of attachment structures may be used to mount the thermal shield with respect to the edge director. Examples may mount the thermal shield at a fixed position relative to the edge director. In further examples, the thermal shield may be adjustably mounted relative to the edge director. For instance the thermal shield may be configured to rotate and/or translate with respect to the edge director. As shown in FIG. 3, for example, the first thermal shield 120*a* may translate along the vertical directions indicated by arrow 140, translate along horizontal directions parallel with the forming vessel 60 indicated by arrow 141, and/or translate along horizontal directions transverse with the forming vessel 60 indicated by arrow 143 (see FIG. 2). In addition or alternatively, the first thermal shield 120*a* may rotate about the vertical direction, horizontal direction and/or the transverse direction as respectively indicated by arrows 140*a*, 141*a*, 143*a* (see FIG. 2). Allowing the thermal shield to rotate and/or translate with respect to the edge director can help adjust the distance and/or angle with respect to the edge director to accommodate various view factors, such as edge director surface characteristics.

Likewise, a variety of attachment structures may be used to mount the one or more heating devices. For example, the heating devices, if provided, may be mounted at a fixed position relative to the edge director. In further examples, the heating devices may be adjustably mounted relative to the edge director. For instance the heating devices may be configured to rotate and/or translate with respect to the edge director. As shown in FIG. 3, for example, the second heating device 170*b* may translate with the first thermal shield 120*a* along the vertical directions indicated by arrow 140, translate along horizontal directions parallel with the forming vessel 60 indicated by arrow 141, and/or translate along horizontal directions transverse with the forming vessel 60 indicated by arrow 143 (see FIG. 2). In addition or alternatively, the heating devices may rotate about the vertical direction, horizontal direction and/or the transverse direction as respectively indicated by arrows 140*a*, 141*a*, 143*a* (see FIG. 2). Allowing the heating devices to rotate and/or translate with respect to the edge director can help adjust the distance and/or angle with respect to the edge director to direct heat in a desired manner to the edge director.

Providing adjustable mounting of the thermal shield and/or the heating devices relative to the edge director can be achieved in a variety of ways. For instance, as shown in FIG. 3, the first thermal shield 120*a* is attached such that adjustment of the first pair of edge rollers 132 results in a corresponding adjustment of the first thermal shield 120*a* (and the second heating device 170*b* attached thereto) relative to the edge director 80*a*. Various mounting techniques may be employed to allow adjustment of the first thermal shield 120*a* relative to the first edge director 80*a*. For example, as shown in FIG. 3, the first thermal shield apparatus 110*a* can include a hook 112 configured to engage an upper portion of the seal plate 136. As shown, the hook 112 may optionally include a clamp screw 114 to form a clamp device 111. As such, the thermal plate 122 of the first thermal shield may be supported in a removable and a cantilever fashion with respect to the seal plate 136. In further examples, the thermal shield may be welded to the seal plate 136 or other structural component to provide a fixed connection therebetween. In an alternative example, a portion or the entire thermal plate 122 may be rotated relative to the edge director 80*a* to provide desirable shielding characteristics. For instance, as shown schematically in FIG. 3, the plate may be provided with a hinge 145 wherein the end 124 of the plate 122 may be rotated relative to the opposed base of the plate 122 about arrow 143*a*. As such, portions of the thermal plate (e.g., including the second heating device 170*b*) may be oriented to face surfaces of the edge director to enhance the shielding capability of the first thermal shield 120*a* and/or the heating characteristics from the second heating device 170*b*. Allowing the thermal shield and/or heating device to rotate and/or translate with respect to the edge director can help adjust the distance and/or angle with respect to the edge director. Such positioning of the thermal shield and/or heating device can permit active managed control of as the process dictates.

As further illustrated in FIG. 3, the apparatus may further include a controller 180 configured to control an adjusted position between the first thermal shield 120*a* and the edge director 80*a* and/or control heating associated with the first thermal shield 120*a*. For example, as shown, the controller 180 can be operably connected to the motor 146 to adjust the vertical position of the first thermal shield 120*a* relative to the edge director 80*a*. Likewise, the controller 180 may be operably connected to similar motors to control horizontal movement along arrow 141 and/or translational movement along arrow 143. In addition or alternatively, the controller 180 may be operably connected relative to one or more motors to control rotational movement of the first thermal shield 120*a* in directions indicated by arrows 140*a*, 141*a*, 143*a*.

In addition or alternatively, the controller 180 may be operably connected to one or more heaters (e.g., heating devices 170*a*, 170*b*, 170*c*) associated with the edge director 80*a*. For example, as shown in FIG. 3, the controller 180 is operably connected with respect to the heating device 170*a* with the understanding that the controller 180 may also be operably connected with respect to heating devices 170*b*, 170*c*. The controller 180 can be configured to regulate the power to the heating devices, thereby increasing or decreasing the heat provided by the heating devices based on feedback or other process parameters. In addition or alternatively, the controller 180 can be designed to adjust the position of the heating devices. For example, the controller 180 can manage motors associated with the heating devices to cause translation (e.g., along arrows 140, 141, 143) and/or rotation (e.g., about directions indicated by arrows 140*a*, 141*a*, 143*a*).

The controller can be configured to operate the heaters and/or the position of the first thermal shield 120*a* based on feedback (e.g., positional, thermal, etc) obtained with respect to the glass making process. For example, as shown, the controller 180 is configured to obtain thermal feedback from a thermal sensor 182. The feedback obtained by the thermal sensor 182 can be used by the controller 180 to adjust at least one of the heating devices and/or the shield in order to provide managed control of a thermal characteristic as the method of making a glass sheet proceeds. The thermal characteristic, for example, can include the temperature and/or heat loss associated with: a portion of the apparatus, such as the heat director; a portion of the end of the forming vessel; portions of the molten glass; and/or other features of the apparatus.

In one example, the thermal sensor 182 may detect a temperature above a target level, wherein the controller 180 may translate and/or rotate the first thermal shield 120*a* to allow more heat to pass to nontarget areas, thereby reducing the temperature until the target level temperature is obtained. In addition or alternatively, the controller 180 may translate and/or rotate the heating device such that less heat is transferred to the target area (e.g., the edge director), thereby reducing the temperature until the target level temperature is obtained. Still further, the controller 180 may reduce power to the heating device, such that less heat is transferred to the target area, thereby reducing the temperature until the target level temperature is obtained.

Alternatively, the thermal sensor 182 may detect a temperature below a target level, wherein the controller 180 may translate and/or rotate the first thermal shield 120*a* to reduce heat loss to nontarget areas, thereby increasing the temperature until the target level temperature is obtained. In addition or alternatively, the controller 180 may translate and/or rotate the heating device such that more heat is transferred to the target area (e.g., the edge director), thereby increasing the temperature until the target level temperature is obtained. Still further, the controller 180 may increase power to the heating device, such that more heat is transferred to the target area, thereby increasing the temperature until the target level temperature is obtained.

The first thermal shield apparatus 110*a* may also include an optional structural rib configured to strengthen the thermal plate 122. For example, as shown in FIG. 3, a structural rib 116 may be attached between the hook 112 and the thermal plate 122 to enhance the structural connection. The structural rib 116 can also help prevent sagging or warping of the thermal plate 122 that may otherwise occur under the elevated operating temperatures. As shown in FIG. 2, two structural ribs 116 may be provided although a single or more than two structural ribs may be included in further examples.

The thermal shields of the disclosure may be fabricated from a wide range of materials that may absorb, reflect, or otherwise provide a thermal shield while maintaining structural integrity under typical temperature conditions associated with the glass making apparatus. For instance, the thermal shield, and other portions of the thermal shield apparatus, can be formed from a refractory material, steel (e.g., stainless steel) or other metal alloys or other materials or combination of materials to meet structural and/or thermal requirements of the apparatus.

Various method of making glass can incorporate various features of the apparatus 10 described above. In one example, batch material can be converted to molten glass received by the forming vessel 60 by way of the example series of glass melt stations. As shown in FIG. 2, the method includes the step of flowing molten glass 17 over the pair of downwardly inclined forming surface portions 66*a*, 66*b* of the forming wedge 62. As shown in FIGS. 2 and 3, the method further includes the steps of flowing molten glass over the edge director and drawing the molten glass from the root 70 of the forming wedge 62 to form the glass sheet 12. The method can also include the optional step of providing a pair of edge rollers that are configured to engage the edge of the glass sheet. The edge rollers can be rotated by the motor 138 glass sheet 12 is drawn from the root 70 of the forming wedge 62.

As further illustrated, the method further includes the step of reducing heat loss from the edge director with the thermal shield. In one example, the thermal shield may be used to reduce heat loss from the edge director to the corresponding pair of edge rollers although the thermal shield may be used to reduce heat loss to other non-target areas in further examples. If the edge rollers are actively cooled, the thermal shield can help isolate the edge rollers from the edge directors, thereby inhibiting heat loss of the edge directors to the edge rollers. The methods can further include the step of heating the interface of the molten glass in contact with the edge director. In such examples thermal shield is positioned to reduce heat loss from the edge director, and thereby enhance the effectiveness of the heating device. The thermal shield may operate to shield the edge director as other areas from heat loss, such as end portions of the forming wedge or the like. It will be appreciated that aspects of the disclosure may positively impact glass edge quality and prevent degradation of edge conditions due to crystal growth that may otherwise occur on the edge director surfaces.

It will be apparent to those skilled in the art that various modifications and variations can be made without departing from the spirit and scope of the claimed invention.

What is claimed is:

1. A fusion draw method of making a glass sheet comprising the steps of:
    flowing molten glass over a pair of downwardly inclined forming surface portions of a forming wedge, the downwardly inclined forming surface portions converging along a downstream direction to form a root;
    flowing the molten glass over an edge director intersecting with at least one of the pair of downwardly inclined forming surface portions;
    drawing the molten glass from the root of the forming wedge to form the glass sheet having a width extending in a transverse direction perpendicular to the downstream direction; and
    reducing heat loss from the edge director with a thermal shield positioned laterally outside of the width of the glass sheet and extending along the transverse direction toward an edge portion of the glass sheet.

2. The method of claim 1, further comprising the step of heating an interface of the molten glass in contact with the edge director with a heating device.

3. The method of claim 2, further comprising the step of using a controller to adjust the heating device to provide managed control of a thermal characteristic as the method of making the glass sheet proceeds.

4. The method of claim 1, further comprising the step of using a controller to adjust a position of the thermal shield with respect to the edge director to provide managed control of a thermal characteristic as the method of making the glass sheet proceeds.

5. The method of claim 1, wherein the thermal shield is positioned downstream from the edge director, further wherein the thermal shield is positioned between the edge director and an edge roller.

6. A fusion draw method of making a glass sheet comprising the steps of:
flowing molten glass over a pair of downwardly inclined forming surface portions of a forming wedge, the downwardly inclined forming surface portions converging along a downstream direction to form a root;
flowing the molten glass over an edge director intersecting with at least one of the pair of downwardly inclined forming surface portions;
drawing the molten glass from the root of the forming wedge to form the glass sheet having a width extending in a transverse direction perpendicular to the downstream direction;
engaging an edge portion of the glass sheet with a pair of edge rollers positioned downstream from the root; and
using a thermal shield to reduce heat loss from the edge director to the pair of edge rollers, the thermal shield positioned laterally outside of the width of the glass sheet and extending along the transverse direction toward the edge portion of the glass sheet.

7. The method of claim 6, further comprising the step of using a controller to adjust a position of the thermal shield with respect to the edge director to provide managed control of a thermal characteristic as the method of making the glass sheet proceeds.

8. The method of claim 6, further comprising the step of heating an interface of the molten glass in contact with the edge director with a heating device.

9. The method of claim 8, further comprising the step of using a controller to adjust the heating device to provide managed control of a thermal characteristic as the method of making the glass sheet proceeds.

10. A fusion draw method of making a glass sheet comprising the steps of:
flowing molten glass over a pair of downwardly inclined forming surface portions of a forming wedge, the downwardly inclined forming surface portions converging along a downstream direction to form a root;
flowing the molten glass over an edge director intersecting with at least one of the pair of downwardly inclined forming surface portions;
drawing the molten glass in the downstream direction along a draw plane from the root of the forming wedge to form the glass sheet; and
reducing heat loss from the edge director with a thermal shield positioned laterally beyond an edge portion of the glass sheet with the thermal shield intersecting the draw plane.

11. The method of claim 10, wherein the glass sheet has a width extending in a transverse direction perpendicular to the downstream direction, and in the step of reducing heat loss, positioning the thermal shield laterally outside of the width of the glass ribbon such that the thermal shield extends along the transverse direction toward the edge portion of the glass sheet.

12. The method of claim 10, further comprising the step of heating an interface of the molten glass in contact with the edge director with a heating device.

13. The method of claim 12, further comprising the step of using a controller to adjust the heating device to provide managed control of a thermal characteristic as the method of making the glass sheet proceeds.

14. The method of claim 10, further comprising the step of using a controller to adjust a position of the thermal shield with respect to the edge director to provide managed control of a thermal characteristic as the method of making the glass sheet proceeds.

15. The method of claim 10, wherein the thermal shield is positioned downstream from the edge director, further wherein the thermal shield is positioned between the edge director and an edge roller.

16. A fusion draw method of making a glass sheet comprising the steps of:
flowing molten glass over a pair of downwardly inclined forming surface portions of a forming wedge, the downwardly inclined forming surface portions converging along a downstream direction to form a root;
flowing the molten glass over an edge director intersecting with at least one of the pair of downwardly inclined forming surface portions;
drawing the molten glass in the downstream direction along a draw plane from the root of the forming wedge to form the glass sheet;
engaging an edge portion of the glass sheet with a pair of edge rollers positioned downstream from the root; and
using a thermal shield to reduce heat loss from the edge director to the pair of edge rollers by positioning the thermal shield laterally beyond the edge portion of the glass sheet with the thermal shield intersecting the draw plane.

17. The method of claim 16, wherein the glass sheet has a width extending in a transverse direction perpendicular to the downstream direction, and in the step of using the thermal shield to reduce heat loss, positioning the thermal shield laterally outside of the width of the glass ribbon such that the thermal shield extends along the transverse direction toward the edge portion of the glass sheet.

18. The method of claim 16, further comprising the step of using a controller to adjust a position of the thermal shield with respect to the edge director to provide managed control of a thermal characteristic as the method of making the glass sheet proceeds.

19. The method of claim 16, further comprising the step of heating an interface of the molten glass in contact with the edge director with a heating device.

20. The method of claim 19, further comprising the step of using a controller to adjust the heating device to provide managed control of a thermal characteristic as the method of making the glass sheet proceeds.

* * * * *